United States Patent Office 3,539,629
Patented Nov. 10, 1970

3,539,629
PROCESS FOR PRODUCING TETRAACETYL
DERIVATIVES OF DIAMINES
Donald G. MacKellar, Trenton, and John H. Blumbergs,
Highland Park, N.J., and Rainer von Falkenstein,
Oberwil-Basel-Land, Switzerland, assignors to FMC
Corporation, New York, N.Y., a corporation of Delaware
No Drawing. Filed Mar. 13, 1968, Ser. No. 712,597
Int. Cl. C07c 103/44
U.S. Cl. 260—561  13 Claims

ABSTRACT OF THE DISCLOSURE

A process for producing compounds having the formula $(H_3COC)_2N-R-N(COCH_3)_2$, wherein R has the structure defined below, by reacting ketene with:
(i) a diacetyl derivative of a diamine having the formula

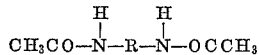

wherein R is:
(1) an aliphatic hydrocarbon spacer group having 1 to 3 carbon atoms between the flanking N atoms which group may have substituents attached to it including:
   (a) aliphatic chains having up to 16 carbon atoms
   (b) cycloaliphatic groups having up to 16 carbon atoms
   (c) phenyl, or substituted phenyl groups, or
(2) an aromatic spacer group which may be:
   (a) a phenylene, or substituted phenylene group
   (b) a benzylidene, or substituted benzylidene group
   (c) a xylylene, or substituted xylylene group, or
(ii) a diamine having the formula $H_2N-R'-NH_2$, where R' is a spacer group identical to R but contains at least two carbon atoms.

The reaction is carried out in the presence of a phosphoric acid (preferably orthophosphoric acid) catalyst at a temperature of between 40° C. and 100° C. In the preferred embodiment of the process, the reaction is carried out with a small amount of sulfur or a sulfur compound in the reaction mixture. The resulting diamine derivatives are useful as components of washing and bleaching compositions.

BACKGROUND OF THE INVENTION

N,N,N',N'-tetraacetylethylenediamine was prepared by Franchimont et al., Rec. Trav. Chim. Vol. 30, pages 183–185 (1911) by reacting diacetylethylenediamine with acetic anhydride at 130–140° C. for several hours. United States Pat. No. 3,223,732 discloses the preparation of N,N,N',N'-tetraacetylmethylenediamine by reacting ketene with N,N-diacetylmethylenediamine in the presence of a p-toluenesulphonic acid catalyst. United States Pat. No. 3,228,983 discloses essentially the same reaction carried out at temperatures betwen 100° C. and 200° C. with a sulfuric acid catalyst. These preparations produce low yields of an impure crude product requiring extensive purification. These diamine derivatives are useful as components of washing and bleaching compositions.

SUMMARY OF THE INVENTION

The present invention is directed to a process for producing compounds having the formula

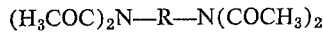

wherein R has the structure defined below, by reacting ketene with:
(i) a diacetyl derivative of a diamine having the formula

wherein R is:
(1) an aliphatic hydrocarbon spacer group having 1 to 3 carbon atoms between the flanking N atoms which group may have substituents attached to it including:
   (a) aliphatic chains having up to 16 carbon atoms
   (b) cycloaliphatic groups having up to 16 carbon atoms
   (c) phenyl, or substituted phenyl groups, or
(2) an aromatic spacer groups which may be:
   (a) a phenylene, or substituted phenylene group
   (b) a benzylidene, or substituted benzylidene group
   (c) a xylylene, or substituted xylylene group, or
(ii) a diamine having the formula $H_2N-R'-NH_2$, where R' is a spacer group identical to R but contains at least two carbon atoms, using phosphoric acid (preferably orthophosphoric acid) as the catalyst, and carrying out the reaction at a temperature between about 40° C. and 100° C. It is preferred that the reaction mixture contains a small effective amount of sulfur or a sulfur compound.

DESCRIPTION OF THE PREFERRED EMBODIMENTS

The tetraacetylhydrocarbon diamines are produced by reacting ketene with a diamine having the formula $H_2N-R-NH_2$ or the diacetyl derivative thereof. Thus, tetraacetylethylenediamine is produced by reacting ketene with either ethylenediamine or diacetylethylenediamine. Tetraacetylmethylenediamine, however, is produced by reacting ketene with diacetylmethylenediamine. Although it would appear to be possible to produce N,N,N'-N'-tetraacetylmethylenediamine by reaction of ketene with the diamine parent compound, that compound, i.e., methylenediamine, is not an available material.

The diamine reactants include those in which R is an alkylene group having 1 to 3 carbon atoms, cycloalkylene groups provided that the amino groups are not separated by more than three carbon atoms, and aryl groups. Illustrative diamines include 1, 2 and 3 butylenediamine, 2 - methylbutylene-1, 3 - diamine, 1 - methyl-methylenediamine, cyclohexylene 1, 2 and 3 diamine, benzylidenediamine, and phenylenediamine. Although the specification largely discusses and explains the invention in terms of the "ethylene" reactants and products, it is to be understood that the disclosure applies to the family of diamine reactants defined and the tetraacetyl products produced therefrom, by the process of the present invention.

The reaction between the diamine and ketene to form tetraacetyl derivatives is a stepwise reaction. When ethylenediamine is reacted with ketene, the diacetylethylenediamine is formed, probably followed by the formation of the triacetylethylenediamine, and then the tetraacetylenediamine. The diacetyl compound is produced by the reaction of the diamine with ketene even in the absence of a catalyst. The diacetyl compound may also be prepared by other methods, e.g., that disclosed in United States Pat. 3,228,983. The reaction of ketene with diacetylethylenediamine to form the tetraacetyl product requires the presence of the phosphoric acid catalyst to obtain the high quality product and high yields characteristic of the process of the present invention.

When the reaction is not carried to completion, the reaction mixture will contain the triacetyl intermediate as well as the desired tetraacetyl product. The reaction rate decreases considerably at the end of the reaction when the concentration of the triacetyl intermediate in the reaction mixture is low. The reaction may be carried out as a batch process or a continuous process. When operating as a batch process, it is most economic to stop the reaction before completion and recycle the unreacted triacetyl intermediate to the reaction vessel for the next batch preparation. The continuous process largely avoids this problem and is preferred.

The phosphoric acid catalyst is utilized in small effective amounts (based on the amount of solid reactant). Although small amounts of the phosphoric acid catalyst result in a useful process, faster reaction rates are obtained when using at least about 2%. It is preferred to use between about 4 and 5%. Larger quantities of catalyst can be used but do not have additional beneficial effect. For practical purposes, it is not contemplated that more than 10% of phosphoric acid would be used. Orthophosphoric acid is preferred as the catalyst, to produce high quality light colored products directly. The other phosphoric acids tend to produce products with less desirable color characteristics, i.e., they may have an off-white or even a tan color which requires purification to obtain the highest quality product characteristics.

The reaction is preferably carried out in a solvent. A large number of organic solvents can be used. The best solvents are those which dissolve sufficient amounts of the tetraacetyl product, as well as the aforedescribed intermediate reaction products. The preferred solvents are chloroform, acetone, toluene, the alkyl acetates and particularly the lower alkyl acetates, the chlorinated aromatic solvents and particularly the chlorinated monocyclicaryl compounds and bicyclicaryl compounds, such as the chlorobenzenes and the chloronaphthalenes. Optimum results have been obtained with chloroform.

The reaction is preferably carried out at temperatures between about 40° C. and 100° C., depending largely on the boiling point of the solvent utilized. The reaction rates decrease considerably if a reaction temperature below 40° C. is employed. Temperatures above about 100° C. increase by-product formation, resulting in lower yields of the desired product. The reaction is preferably carried out at a temperature between 50° C. and 95° C.

It has been discovered that the presence of sulfur in the reaction mixture tends to increase the yield and improve the quality of the product. The effect of the sulfur addition is most pronounced in continuous operation as is apparent from Example 6 herein. Although small effective amounts of as little as 0.2% sulfur are useful, it is preferred to use at least 1% by weight (based on the solid reactant). Larger quantities can be used but do not appear to have additional beneficial effect. Elemental sulfur, while effective has the disadvantage that the product obtained has a slight odor which is readily removed by vacuum treatment. The use of sulfur compounds such as phenothiazine and methylthio-m-cresol achieves the desired reaction improvement without causing odor.

The following examples further illustrate the invention. All parts or percentages specified in the application are by weight.

Example 1

A 3000 ml., three-neck flask with baffle indentations supplied with a laboratory stirrer, a thermometer and a condenser was charged with 1,200 ml. of chloroform, 120 grams (2 moles) of ethylenediamine, and 7 grams of orthophosphoric acid. The mixture was stirred and heated to 50–55° C., and ketene was introduced through an inlet tube at a flow rate of 0.0337 mole per minute, for four hours. The reaction mixture was then cooled to −8° C. with good stirring. The solids were separated by filtration, washed twice with cold chloroform at −20° C., and then dried under reduced pressure in an evaporator to yield 322 grams of white, crystalline N,N,N',N'-tetraacetylethylenediamine product. The solvent was then evaporated from the mother liquor to yield an additional crop of 82 grams of product, resulting in a total product yield of 87%.

The foregoing procedure was repeated except that 7 grams of sulfuric acid was used in place of the 7 grams of orthophosphoric acid. 266 grams of crude N,N,N',N'-tetraacetylethylenediamine was obtained for a yield of 59%. The experiment was also repeated using 7 grams of p-toluenesulfonic acid in place of the 7 grams of orthophosphoric acid, to obtain 290 grams of crude N,N,N',N'-tetraacetylethylendiamine for a yield of 61%. In each of these two latter runs the crude product was an off-color material.

Example 2

The procedure and apparatus of Example 1 was utilized without the use of any acid. A complete consumption of the ketene was observed in the first two hours of operation, after which the ketene consumption stopped. After filtration of the reaction mixture, 212 grams of white, crystalline solids were collected on the filter. These were dried and analyzed and determined to be N,N'-diacetylethylenediamine. An additional crop of 72 grams of this product was obtained by evaporation of the solvent under reduced pressure. Total yield of the N,N'-diacetylethylenediamine was 99.2%.

Example 3

The same apparatus used in Example 1 was utilized. The flask was charged with 1,500 ml. of acetone, 45 grams of N,N'-diacetylethylenediamine and 2 grams of orthophosphoric acid as the catalyst. The reaction mixture was stirred and heated to 50° C. and then ketene was introduced into the reaction mixture at a rate of 0.031 mole per minute, for 20 minutes. The reaction mixture, after the run, was practically colorless, showing a reading of less than "1" on the Gardner scale. The acid was neutralized with dry soda ash. The reaction mixture was filtered to remove the excess of soda ash and sodium phosphate formed in the neutralization step, and the filtrate was evaporated to remove the acetone solvent. The crude N,N,N',N'-tetraacetylethylenediamine showed less than "1" color on the Gardner scale in a 10% solution in chloroform. 73.6 grams of the crude product was obtained indicating a practically quantitative yield.

The same procedure and apparatus was utilized, except that 1 ml. of concentrated sulfuric acid was used in place of the 2 grams of orthophosphoric acid. The process resulted in the production of (after recrystallization in toluene and washing with hexane) a 22% yield of yellow crystals of N,N,N',N'-tetraacetylethylenediamine. The product showed a reading of "4.5" on the Gardner scale in a 10% solution in chloroform. A similar run was carried out except that the orthophosphoric acid was replaced by 2 grams of p-toluenesulfonic acid, to produce, after purification, 26.6 grams of a cream colored product (37% yield) showing a color of "2" on the Gardner scale in a 10% solution in chloroform.

Example 4

The procedure of Example 3 was repeated, except that ethylacetate was used as the reaction solvent in place of the acetone. The results were generally similar to those described in Example 3. The products obtained using the orthophosphoric acid catalyst showed a Gardner color of less than "1." The corresponding product for the run using sulfuric acid had a Gardner color of "8.5," and that for the run using p-toluenesulfonic acid had a Gardner color of "3.5."

Example 5

The apparatus described in Example 1 was utilized. The flask was charged with 1200 ml. of toluene, 36 grams of the N,N'-diacetylethylenediamine and 1 ml. of orthophosphoric acid. The reaction mixture was heated to 95° C. with good stirring and ketene was introduced into the reaction mixture at a flow rate of 0.0206 mole per minute for 30 minutes while maintaining the temperature at 94–95° C. After the ketene flow was stopped, the reaction mixture was agitated for an additional five minutes, and then cooled to 2° C. The crystals formed were filtered and washed with hexane, resulting in 31.5 grams of solids. The mother liquor was evaporated giving another 21.2 grams of a second crop of the product, for a total yield of 91% of N,N,N′,N′-tetraacetylethylenediamine.

Example 6

A 3000 ml., 4-necked flask with baffle indentations was supplied with a laboratory stirrer and a ketene inlet tube, similar to that described in Example 1. The third neck was connected to a side arm with an ethylenediamine-charging burette in one opening and a condenser in the other. The fourth neck was used to take out the product during the run. The flask was charged with 1200 ml. of chloroform, 350 grams of N,N,N′,N′-tetraacetylethylenediamine, 10 grams of N,N′-diacetylethylenediamine and 10 grams of orthophosphoric acid, giving a total volume in the reaction flask of approximately 1500 ml. The reaction mixture was heated to 60° C. and maintained at this temperature during the run by means of a hot water bath.

The burette was filled with commercial ethylenediamine, assay 98–98.6% and diluted with an equal volume of chloroform. The ethylenediamine was charged into the reaction mixture at a rate of 0.27 mole per hour, while simultaneously charging in ketene at a rate of 1.092 moles per hour. An aliquot of 150 ml. of the reaction mixture was withdrawn from the reaction flask every 30 minutes. This aliquot was cooled to 25° C. and was filtered. The solids collected on the filter were dried in an evaporator and were weighed. The mother liquor was recycled into the reaction flask. A small purge, approximately 5%, was withheld and was replaced with fresh chloroform. The purge was evaporated under reduced pressure and the N,N,N′,N′-tetraacetylethylenediamine product in this purge was isolated by crystallization.

Four runs were made by the continuous process described above. The results follow:

*Run I.*—This run was operated exactly, following the description above for 16 hours. In the first six hours, the product was obtained as white, crystalline solids and the reaction mixture was practically colorless. However, after more than six hours in operation, the reaction mixture started to discolor and turned dark after 16 hours in operation. The product obtained in the last hours of operation was yellowish brown, indicating that colored by-products were formed in this operation. The yield of product in the first 6.5 hours in operation was 86%, but decreased to 74% after 16 hours in operation.

*Run II.*—The same as Run I, except that 2 grams of sulfur were added to the reaction mixture. This run was operated for 21 hours, with the following results:

(1) After the first 6.5 hours in operation, 374.4 grams of white, crystalline product was collected. Total ethylenediamine feed in this period was 105 grams (1.75 moles). The yield was 93.8%. The reaction mixture was practically colorless.

(2) After the second 6.5 hours in operation, 373.6 grams of white, crystalline product was collected, corresponding to a yield of 93.4%, based on the commercial ethylenediamine feed.

(3) After an additional 8 hours in operation, 460.1 grams of white, crystalline product was obtained. The ethylenediamine feed in this period was 130 grams (2.16 moles). The yield was 93.4%.

After 21 hours in operation, the total amount of N,N,N′N′-tetraacetylethylenediamine product obtained was 1208 grams, and the total amount of ethylenediamine charged into the reaction flask was 340 grams. The yield was 93.5%, based on the commercial ethylenediamine feed, which had an assay of 98–98.6%. The theoretical yield was approximately 95%.

*Run III.*—The same as Run II, except that 10 grams of sulfuric acid was used as a catalyst instead of the orthophosphoric acid. The reaction mixture turned yellow in the first 30 minutes in operation and the first product crop obtained was also yellow. After two hours in operation, the reaction mixture was already dark and the run was discontinued.

*Run IV.*—The same as Run II, except that 10 grams of p-toluenesulfonic acid was used as the catalyst. The reaction mixture started to discolor in two hours and the first crop of product obtained was cream colored, later one being yellow. The run was discontinued after 6 hours in operation when the reaction mixture was already dark.

Example 7

The procedure of Example 3 was used. However, only 42 grams of N,N′-diacetylmethylenediamine were used instead of 45 grams N,N′-diacetylethylenediamine. There were obtained 65 grams of crude N,N,N′,N′-tetraacetylmethylenediamine having a color of less than "1" on the Gardner scale in a 10% solution in chloroform. The yield was 95.6%.

Example 8

The procedure of Example 3 was used, except that 45 grams of ethylidenediaminediacetate, having the formula of

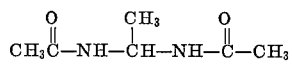

were used as the reactant. After evaporation of the solvent, 72 grams (98.7% yield) of white, crystalline material was obtained, which was identified as N,N,N′N′-tetraacetylethane-1,1-diamine, having the following formula:

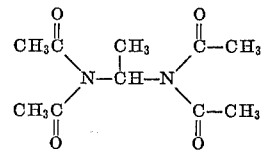

Example 9

The procedure of Example 3 was used, except that 65 grams of benzylidenediaminediacetate, having the formula of

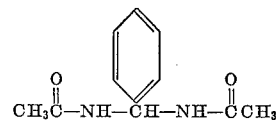

were used as the reactant. The yield of white, crystalline product was 88 grams, which corresponds to 94.7% based on the feed. The product was identified as N,N,N′,N′-tetraacetyltoluenediamine, having the following formula:

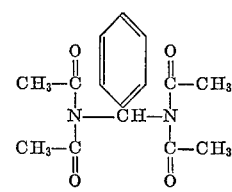

Example 10

The procedure of Example 2 was used, except that 216 grams of purified p-phenylendiamine were used as the reactant instead of the 120 grams of ethylenediamine. There were obtained 370 grams of white solids of N,N′-diacetyl-p-phenylenediamine. The yield was 96.4% of theoretical.

Example 11

The procedure of Example 3 was used, except that 60 grams of N,N-diacetyl-p-phenylenediamine obtained in Example 10 were used as the reactant. After evaporation of the reaction solvent, 80 grams of white product of N,N,N',N'-tetraacetyl-p-phenylendiamine were obtained. The yield was 91% of theoretical.

Example 12

The procedure of Example 6, Run II was used, except that 2 grams of phenothiazine were substituted for the sulfur. After 21 hours of operation, the yield of tetraacetylethylenediamine was 94% and the reaction mixture was practically colorless.

Example 13

The procedure of Example 12 was used, except that two grams of methylthio-m-cresol were used instead of the phenothiazine.

The use of orthophosphoric acid as the catalyst in the synthesis results in higher yields and improved crude product purity. The use of one of the other phosphoric acids, as the reaction catalyst also results in the production of the tetraacetyl products in good yield. The improved results are also obtained utilizing the other preferred solvents, such as the chlorinated benzene derivatives and chlorinated naphthalene derivatives. Best results were obtained with the chloroform solvent.

What is claimed is:

1. The process for producing a compound having the formula $(H_3COC)_2N—R—N(COCH_3)_2$, wherein R has the structure defined below, by reacting ketene with a compound selected from the group consisting of:
   (i) a diacetyl of a diamine having the formula

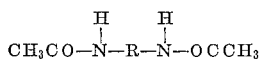

wherein R is selected from the group consisting of:
   (a) an alkylene hydrocarbon spacer group having 1 to 3 carbon atoms between the flanking nitrogen groups,
   (b) an aromatic spacer group which is selected from the group consisting of phenylene, benzylidene, and xylylene groups and
   (c) cyclohexylene and
   (ii) a diamine having the formula $H_2N—R'—NH_2$, wherein R' is a spacer group identical to R but contains at least two carbon atoms, in the presence of from 1 to 10% of phosphoric acid as a catalyst, based on the solid reactant, at a temperature between 40° C. and 100° C.

2. The process of claim 1, wherein the hydrocarbon group R is selected from the group consisting of:
   (i) an alkylene hydrocarbon spacer group having 1 to 3 carbon atoms between the flanking nitrogen atoms, and said spacer group has substituents attached thereto selected from the group consisting of:
   (a) alkyl radicals having up to 3 carbon atoms, and
   (b) phenyl groups;
   and wherein the hydrocarbon group R' is a spacer group identical to R but contains at least two carbon atoms.

3. The process of claim 2, wherein said phosphoric acid is orthophosphoric acid in an amount between 2% and 5%; and wherein the reaction mixture contains at least one solvent selected from the group consisting of chloroform, acetone, toluene, loweralkyl acetates, and the chlorinated monocyclic- and bicyclicaryls.

4. The process of claim 3, wherein said hydrocarbon group R is selected from the group consisting of alkylene radicals containing up to 3 carbon atoms, benzylidene, and phenylene; wherein said hydrocarbon group R' is selected from the group consisting of alkylene radicals containing from 2 to 3 carbon atoms, benzylidene and phenylene; wherein said orthophosphoric acid is present in an amount between 4 and 5%; and wherein the reaction mixture contains at least 0.2% based on the amount of solid reactant in the reaction mixture of a sulfur material selected from the group consisting of sulfur, phenothiazine, and methylthio-m-cresol.

5. The process of claim 4, wherein the reaction mixture contains at least 1% of said sulfur material.

6. The process of claim 5, wherein said solvent is chloroform.

7. The process of claim 6, wherein said reaction is carried out at a temperature between 50 and 95° C.

8. The process of claim 1, wherein ketene is reacted with a diacetyl derivative of a diamine having the formula $H_2N—R—NH_2$.

9. The process of claim 5, wherein ketene is reacted with a diacetyl derivative of a diamine having the formula $H_2N—R—NH_2$.

10. The process of claim 1, wherein R and R' are $—CH_2CH_2—$.

11. The process of claim 5, wherein R and R' are $—CH_2CH_2—$.

12. The process of claim 8, wherein R is $—CH_2CH_2—$; wherein between 4 and 5% of orthophosphoric acid is present as the catalyst; and wherein the reaction mixture also contains at least 1% based on the solids present of a sulfur material selected from the group consisting of sulfur, phenothiazine, and methylthio-m-cresol.

13. The process of claim 12, wherein the reaction is in chloroform as a solvent; and wherein the reaction is carried out at a temperature between 50° and 65° C.

References Cited

UNITED STATES PATENTS 3,223,732   12/1965   Viveen et al. _____ 260—561

ALEX MAZEL, Primary Examiner

R. V. RUSH, Assistant Examiner

U.S. Cl. X.R.

260—562